US006834534B2

(12) United States Patent
Halla et al.

(10) Patent No.: US 6,834,534 B2
(45) Date of Patent: Dec. 28, 2004

(54) FUEL STORAGE TANK LEAK PREVENTION AND DETECTION SYSTEM AND METHOD

(75) Inventors: Don Halla, Southington, CT (US); Richard Dolson, Collinsville, CT (US); Robert P. Hart, East Hampton, CT (US); Richard Lucas, Enfield, CT (US); Ray Hutchinson, Houma, LA (US); Kent Reid, Canton, CT (US)

(73) Assignee: Veeder-Root Company, Simsbury, CT (US)

( * ) Notice: Subject to any disclaimer, the term of this patent is extended or adjusted under 35 U.S.C. 154(b) by 0 days.

(21) Appl. No.: 10/390,346

(22) Filed: Mar. 17, 2003

(65) Prior Publication Data

US 2004/0182136 A1 Sep. 23, 2004

(51) Int. Cl.$^{7}$ ......................... G01M 3/26; G08B 21/00; B65G 5/00

(52) U.S. Cl. ................ 73/49.2; 220/560.03; 220/567.1; 220/567.2; 340/605; 405/54

(58) Field of Search ................................ 73/49.2, 49.3; 220/560.03, 567.1, 567.2; 340/605; 405/52, 53, 54

(56) References Cited

U.S. PATENT DOCUMENTS 2,821,993 A 2/1958 Pacey et al.
2,941,147 A 6/1960 McKinlay, Jr. .............. 220/9 A
2,947,147 A 8/1960 Johnson
3,848,765 A 11/1974 Durkop
3,995,472 A 12/1976 Murray
4,088,987 A 5/1978 Resler et al.
4,523,454 A 6/1985 Sharp
4,653,312 A 3/1987 Sharp
4,672,366 A 6/1987 Butts
4,676,093 A 6/1987 Pugnale et al.
4,708,015 A 11/1987 Sharp
4,805,444 A 2/1989 Webb
4,863,710 A 9/1989 Rule et al.
4,971,477 A 11/1990 Webb et al.
5,018,864 A 5/1991 Richert ........................ 356/635
5,072,623 A * 12/1991 Hendershot ................. 73/49.2
5,081,864 A 1/1992 Zaim
5,098,221 A 3/1992 Osborne
5,115,936 A 5/1992 Bartlow
5,117,677 A * 6/1992 Hendershot et al. ......... 73/49.2
5,184,504 A 2/1993 Spring (List continued on next page.)

OTHER PUBLICATIONS

Website, "Red Jacket—Quantum," www.redjacket.com/quantum.htm, printed May. 27, 2003.

Website, "Veeder–Root—Interstitial Steel Tanks," www.veeder–root.com/dynamic/index.cfm?pageID=175, printed May 27, 2003.

*Primary Examiner*—Daniel S. Larkin
(74) *Attorney, Agent, or Firm*—Withrow & Terranova, PLLC

(57) ABSTRACT

A storage tank leak detection and prevention system that detects a breach or leak in the interstitial space of a double-walled fuel storage tank in a service station environment. The interstitial space is placed under a vacuum using a submersible turbine pump that is also used to pump fuel to the fuel dispensers in the service station and therefore a separate vacuum generating source is not required. A sensing unit and/or tank monitor monitors the vacuum level in the interstitial space over time. If a significant vacuum level change occurs in the interstitial space after the interstitial space is placed under a vacuum level, a catastrophic leak detection alarm is generated. If a minor vacuum level change occurs in the interstitial space after the interstitial space is placed under a vacuum, a precision leak detection alarm is generated. Functional tests also ensure that the leak detection system is functioning properly.

52 Claims, 7 Drawing Sheets

U.S. PATENT DOCUMENTS

| | | | |
|---|---|---|---|
| 5,263,794 | A | 11/1993 | Webb |
| 5,265,652 | A | 11/1993 | Brunella |
| 5,297,896 | A | 3/1994 | Webb |
| 5,301,721 | A | 4/1994 | Hartmann |
| 5,398,976 | A | 3/1995 | Webb |
| 5,400,646 | A | 3/1995 | Kraus et al. ................ 73/49.2 |
| 5,527,130 | A | 6/1996 | Webb |
| 5,713,607 | A | 2/1998 | Webb |
| 5,722,699 | A | 3/1998 | Brancher |
| 5,746,454 | A | 5/1998 | Webb |
| 5,782,275 | A | 7/1998 | Hartsell, Jr. et al. |
| 5,831,149 | A | 11/1998 | Webb |
| 5,911,155 | A | 6/1999 | Webb |
| 5,927,762 | A | 7/1999 | Webb |
| 5,975,110 | A | 11/1999 | Sharp |
| 5,975,132 | A | 11/1999 | Gleeson |
| 6,029,505 | A | 2/2000 | Webb |
| 6,032,699 | A | 3/2000 | Cochran et al. |
| 6,067,527 | A | 5/2000 | Lovell et al. |
| 6,070,760 | A | 6/2000 | Kenney et al. |
| 6,116,815 | A | 9/2000 | Chen |
| 6,126,409 | A | 10/2000 | Young |
| 6,223,765 | B1 | 5/2001 | Small et al. |
| 6,489,894 | B2 | 12/2002 | Berg |
| 6,523,581 | B2 | 2/2003 | Pendleton et al. |

* cited by examiner

FUEL STORAGE TANK LEAK PREVENTION AND DETECTION SYSTEM AND METHOD

FIELD OF THE INVENTION

The present invention relates to detection of a leak or breach in a fuel storage tank and/or in the interstitial space of a storage tank, and particularly for fuel storage tanks used to hold fuel in retail service station environments.

BACKGROUND OF THE INVENTION

In service station environments, fuel is delivered to fuel dispensers from fuel storage tanks. The fuel storage tanks are large containers located beneath the ground that contain fuel. A separate fuel storage tank is provided for each fuel type, such as low octane gasoline, high-octane gasoline, and diesel. In order to deliver the fuel from the fuel storage tanks to the fuel dispensers, a submersible turbine pump is provided that pumps the fuel out of the fuel storage tank and delivers the fuel through a main fuel piping conduit that runs beneath the ground in the service station.

Due to regulatory requirements governing service stations, fuel storage tanks are required to be encased in a second or outer casing such that the fuel storage tank contains two walls. These tanks are sometimes referred to as "double-walled tanks." A double-walled tank is comprised of an inner vessel that holds liquid fuel surrounded by an outer casing. An annular space, also called an "interstitial space," is formed between the inner vessel and the outer casing. Any leaked fuel that occurs due to a breach of the inner vessel is captured inside the interstitial space instead of leaking to the ground so long as there are no breaches in the outer casing. The outer casing of the fuel storage tank serves as an extra measure of protection to prevent leaked fuel from reaching the ground. An example of double-walled fuel storage tank is disclosed in U.S. Pat. No. 5,115,936, incorporated herein by reference in its entirety.

It is possible that the outer casing of the double-walled fuel storage tank could contain a leak or breach. In this case, if fuel leaks out of the inner vessel into the interstitial space, this fuel may escape to the ground through breach in the outer casing. Therefore, it is desirable to determine if there is a breach or leak in the outer casing of the fuel storage tank as soon as possible before a fuel leak occurs so that such breach can be alleviated before any leaked fuel from the inner vessel could reach the ground.

Prior known leak detection systems are described in U.S. Pat. Nos. 4,676,093 and 4,672,366. These patents disclose a "dry" and "wet" leak detection systems that both have drawbacks. The "dry" system consists of placing detectors sensitive to the presence of fluid in the interstitial space of the fuel storage tank. A sensor detects a leak in the interstitial space, but this leak would reach the ground if a leak also existed in the outer casing of the fuel storage tank since a breach in the outer casing is not detected in this system.

In the "wet" system, the interstitial space is filled with a liquid, such as ethylene glycol, water, or brine solution. When either the inner vessel or the outer casing of the fuel storage tank is punctured or otherwise develops a leak, at least a portion of the liquid contained in the interstitial space will flow through such leak resulting in a reduction of volume of the solution. However, these systems only detect a leak when the leak has already occurred into the environment.

Another leak detection system that incorporates pressure monitoring is described in U.S. Pat. No. 3,848,765. This patent describes monitoring the pressure in the interstitial space of the fuel storage tank as a method of determining if a breach exists. If a certain amount of pressure decay occurs, this is indicative of a breach or leak in the outer casing of the fuel storage tank that will result in a leak of fuel to the environment should the inner wall of the fuel storage tank develop a leak. This system has the advantage of possibly detecting a breach in the outer casing of the fuel storage tank before a leak occurs so that preventive measures and alarms can be generated before any leaked fuel reaches the environment. However, a major drawback of this system is that it requires a vacuum generator to pressurize the interstitial space so that pressure decay in the interstitial space, if any, can be monitored. However, providing a vacuum generator to pressurize the interstitial space adds substantial costs in both the cost of the vacuum generator and its installation and maintenance costs thereby making such a system extremely cost prohibitive.

The present invention involves use of vacuum level monitoring of the interstitial space of a double-walled fuel storage tank to determine if a breach or leak exists in the outer casing of the tank since this technique has the advantage of detecting a breach possibly before a leak actually occurs. However, the present invention, unlike previous pressure monitoring systems, eliminates the extra cost of an additional vacuum generator to pressurize the interstitial space thereby making this system much more feasible to deploy.

SUMMARY OF THE INVENTION

The present invention relates to a sensing unit and tank monitor that monitors the vacuum level in the interstitial space of a double-walled fuel storage tank to determine if a breach or leak exist in the outer casing of the fuel storage tank. If the interstitial space cannot maintain a vacuum level and over a given amount of time after being pressurized, this is indicative that the outer casing of the fuel storage tank contains a breach or leak. If the inner vessel of the fuel storage tank were to incur a breach or leak such that fuel reaches the interstitial space of the fuel storage tank, this same fuel would also have the potential to reach the ground through the breach in the outer casing.

A sensing unit is provided that is communicatively coupled to a tank monitor or other control system. The sensing unit contains a pressure sensor that is coupled to vacuum tubing. The vacuum tubing is coupled to the interstitial space of the fuel storage tank, and is also coupled to a submersible turbine pump (STP) so that the STP can be used as a vacuum source to generate a vacuum level in the vacuum tubing and the interstitial space. The sensing unit and/or tank monitor determines if there is a leak or breach in the interstitial space by generating a vacuum in the interstitial space using the STP and subsequently monitoring the interstitial space using a pressure sensor to determine if the vacuum level changes significantly to indicate a leak. The system checks for both catastrophic and precision leaks.

In one leak detection embodiment of the present invention, the STP provides a vacuum source to the vacuum tubing and the interstitial space of the fuel storage tank. The tank monitor receives the vacuum level of the interstitial space via the measurements from the pressure sensor and the sensing unit. After the vacuum level in the interstitial space reaches a defined initial threshold vacuum level, the STP is deactivated and isolated from the interstitial space. The vacuum level of the interstitial space is monitored. If the vacuum level decays to a catastrophic threshold vacuum level, the STP is activated to restore the vacuum level. If the STP cannot restore the vacuum level to the defined initial threshold vacuum level in a defined amount of time, a catastrophic leak detection alarm is generated and the STP is shut down.

If the vacuum level in the interstitial space is restored to the defined initial threshold vacuum level within a defined period of time, a precision leak detection test is performed. The sensing unit monitors the vacuum level in the interstitial space to determine if the vacuum level decays to a precision threshold vacuum level within a defined period of time, in which case a precision leak detection alarm is generated, and the STP may be shut down.

Once a catastrophic leak or precision leak detection alarm is generated, service personnel are typically dispatched to determine if a leak really exists, and if so, to take corrective measures. Tests are conducted to determine if the leak exists in the vacuum tubing in the sensing unit or in the interstitial space.

The sensing unit also contains a liquid trap conduit. A liquid detection sensor is placed inside the liquid trap conduit so that any liquid that leaks in the sensing unit are reported. The sensing unit and tank monitor can detect liquid in the sensing unit at certain times or at all times If a liquid leak is detected by the tank monitor, the tank monitor will shut down the STP if so programmed.

Functional tests may also be performed to determine if the vacuum leak detection and liquid leak detection systems of the present invention are functioning properly. For the functional vacuum leak detection test, a leak is introduced into the interstitial space. A vacuum leak detection alarm not being generated by the sensing unit and/or the tank monitor is indicative that some component of the vacuum leak detection system is not working properly.

A functional liquid leak detection test can be also used to determine if the liquid detection system is operating properly. The liquid detection sensor is removed from the liquid trap conduit and submerged into a container of liquid or a purposeful liquid leak is injected into the liquid trap conduit to determine if a liquid leak detection alarm is generated. A liquid leak detection alarm not being generated by the sensing unit and/or the tank monitor is indicative that there has been a failure or malfunction with the liquid detection system.

The tank monitor may be communicatively coupled to a site controller and/or remote system to communicate leak detection alarms and other information obtained by the sensing unit. The site controller may pass information from the tank monitor onward to a remote system, and the tank monitor may communicate such information directly to a remote system.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
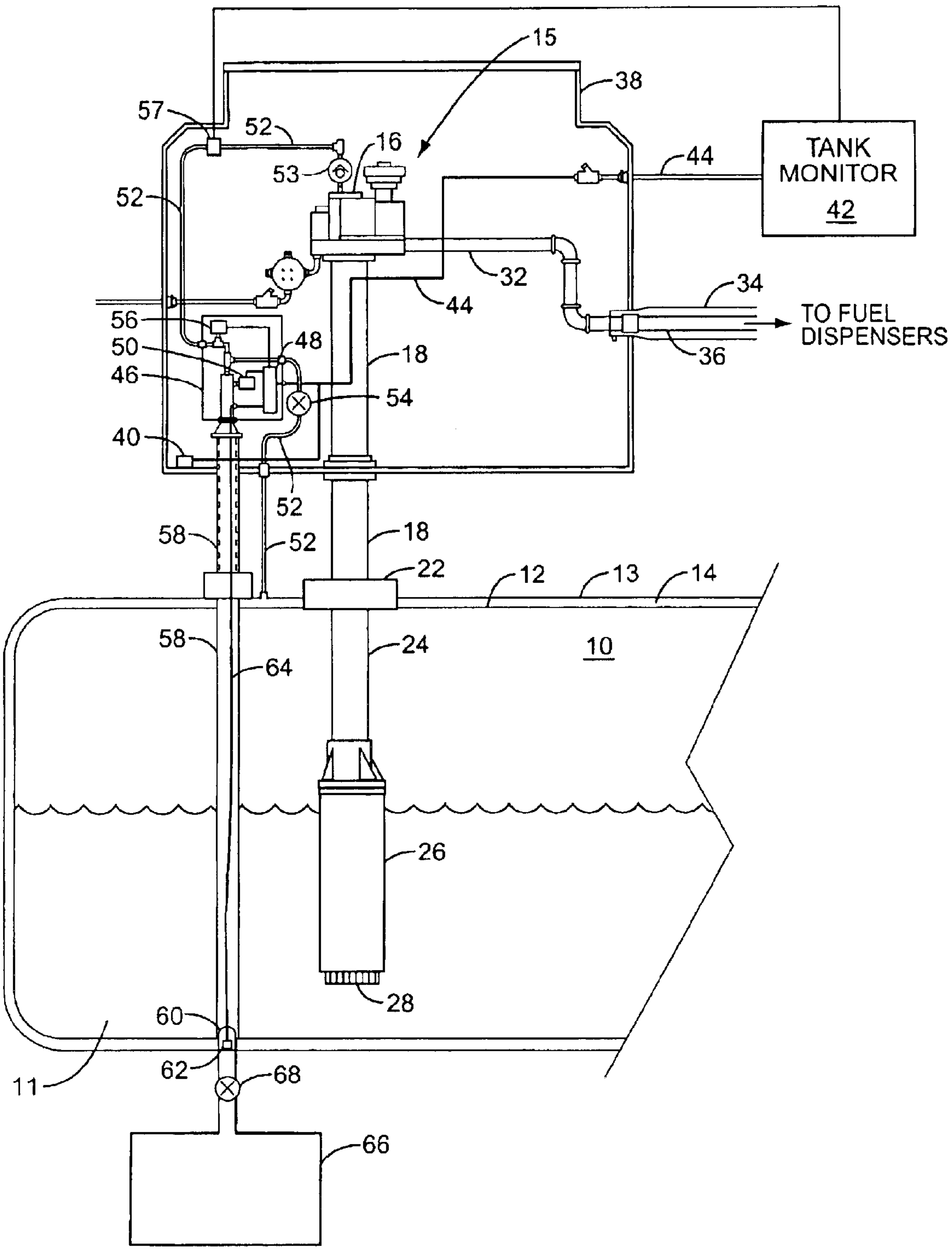
FIG. 1 is a schematic diagram of the vacuum level sensing system of the present invention.

FIG. 1 illustrates a sensing unit according to the present invention that monitors the vacuum level of the interstitial space of a fuel storage tank to determine if a leak or breach exists in the outer casing of the fuel storage tank. A fuel storage tank 10, also known as an "underground storage tank," is provided to hold fuel 11 for delivery to fuel dispensers (not shown) in a service station environment. The fuel storage tank 10 is a double-walled tank comprised of an inner vessel 12 that holds the fuel 11 surrounded by an outer casing 13. The outer encasing 13 provides an added measure of security to prevent leaked fuel 11 from reaching the ground. Any leaked fuel 11 from the inner vessel 12 will be captured in the space 14 that is formed between the inner vessel 12 and the outer casing 13. This space is called the "interstitial space" 14.

A submersible turbine pump (STP) 15 is provided to pump the fuel 11 from the fuel storage tank 10 and deliver the fuel 11 to the fuel dispensers in the service station. An example of a STP 15 is the Quantum™ manufactured and sold by the Marley Pump Company and disclosed at http://www.redjacket.com/quantum.htm. Another example of a STP 15 is disclosed in U.S. Pat. No. 6,126,409, incorporated hereby by reference in its entirety. The STP 15 is comprised of a STP housing 16 that incorporates a vacuum pump and electronics (not shown). Typically, the vacuum pump is a venturi that is created using a portion of the pressurized fuel product, but the STP 15 is not limited to such an embodiment. The STP 15 is connected to a riser pipe 18 that extends down from the STP 15 inside the STP housing 16 and out of the STP housing 16. The riser pipe 18 is mounted to the fuel storage tank 10 using a mount 22. A fuel supply pipe (not shown) is coupled to the STP 15 and is located inside the riser pipe 18. The fuel supply pipe extends down into the fuel storage tank 10 in the form of a boom 24 that is fluidly coupled to the fuel 11.

The boom 24 is coupled to a turbine housing 26 that contains a turbine or also called a "turbine pump" (not shown), both of which terms can be used interchangeably. The turbine pump is electrically coupled to the STP electronics in the STP 15. When one or more fuel dispensers in the service station are activated to dispense fuel, the STP electronics are activated to cause the turbine inside the turbine housing 26 to rotate to pump fuel 11 into the turbine housing inlet 28 and into the boom 24. The fuel 11 is drawn through a conduit (not shown) in the riser pipe 18 and delivered to a fuel conduit 32 that is coupled to a main fuel piping 34. The main fuel piping 34 is coupled to the fuel dispensers in the service station whereby the fuel 11 is delivered to a vehicle. If the main fuel piping 34 is a double-walled piping, the main fuel piping 34 will have an interstitial space 36 as well to capture any leaked fuel.

The STP 15 is typically placed inside a STP sump 38 so that any leaks that occur in the STP 15 are contained within the STP sump 38 and are not leaked to the ground. A sump liquid sensor 40 may also be provided inside the STP sump 38 to detect any such leaks so that the STP sump 38 can be periodically serviced to remove any leaked fuel. The sump liquid sensor 40 may be communicatively coupled to a control system or a tank monitor 42 via a communication line 44 so that the control system or tank monitor 42 can report liquid in the STP sump 38 to an operator and/or generate an alarm. An example of a tank monitor 42 is the TLS-350 manufactured by the Veeder-Root Company. The tank monitor 42 can be any type of monitoring device or other type of controller or control system.

A sensing unit 46 is either provided inside or outside the STP sump 38 and/or STP housing 16 that monitors the vacuum level in the interstitial space 14 of the fuel storage tank 10. If the interstitial space 14 cannot maintain a vacuum level over a given period of time after being pressurized, this is indicative that the outer casing 13 contains a breach or leak. In this instance, if the inner vessel 12 were to incur a breach or leak such that fuel 11 reaches the interstitial space 14, this same fuel 11 would also have the potential to reach the ground through the breach in the outer casing 13. Therefore, it is desirable to know if the outer casing 13 contains a breach or leak when it occurs and before a leak or breach occurs in the inner vessel 12, if possible, so that appropriate notifications, alarms, and measures can be taken in a preventive manner rather than after a leak of fuel 11 to the ground occurs. It is this aspect of the present invention that is described below.

The sensing unit 46 is comprised of a sensing unit controller 48 that is communicatively coupled to the tank monitor 42 via a communication line 44. The communication line 44 is provided in an intrinsically safe enclosure inside the STP sump 38 since fuel 11 and or fuel vapor may be present inside the STP sump 38. The sensing unit controller 48 may be any type of microprocessor, micro-controller, or electronics that is capable of communicating with the tank monitor 42. The sensing unit controller 48 is also electrically coupled to a pressure sensor 50. The pressure sensor 50 is coupled to a vacuum tubing 52. The vacuum tubing 52 is coupled to the STP 15 so that the STP 15 can be used as a vacuum source to generate a vacuum level, which may be a positive or negative vacuum level, inside the vacuum tubing 52. The vacuum tubing 52 is also coupled to the interstitial space 14 of the fuel storage tank 10. A check valve 53 may be placed inline to the vacuum tubing 52 if it is desired to prevent the STP 15 from ingressing air to the interstitial space 14 of the fuel storage tank 10.

An isolation valve 54 may be placed inline the vacuum tubing 52 between the sensing unit 46 and the interstitial space 14 of the fuel storage tank 10 to isolate the sensing unit 46 from the interstitial space 14 for reasons discussed later in this application. A vacuum control valve 56 is also placed inline to the vacuum tubing 52 between the pressure sensor 50 and the STP 15. The vacuum control valve 56 is electrically coupled to the sensing unit controller 48 and is closed by the sensing unit controller 48 when it is desired to isolate the STP 15 from the interstitial space 14 during leak detections tests as will be described in more detail below. The vacuum control valve 56 may be a solenoid-controlled valve or any other type of valve that can be controlled by sensing unit controller 48.

An optional differential pressure indicator 57 may also be placed in the vacuum tubing 52 between the STP 15 and sensing unit 46 on the STP 15 side of the vacuum control valve 57. The differential pressure indicator 57 may be communicatively coupled to the tank monitor 42. The differential pressure indicator 57 detects whether a sufficient vacuum level is generated in the vacuum tubing 52 by the STP 15. If the differential pressure indicator 57 detects that a sufficient vacuum level is not generated in the vacuum tubing 52 by the STP 15, and a leak detection test fails, this may be an indication that a leak has not really occurred in the interstitial space 14. The leak detection may have been a result of the STP 15 failing to generate a vacuum in the vacuum tubing 52 in some manner. The tank monitor 42 may use information from the differential pressure indicator 57 to discriminate between a true leak and a vacuum level problem with the STP 15 in an automated fashion. The tank monitor 42 may also generate an alarm if the differential pressure indicator 57 indicates that the STP 15 is not generating a sufficient vacuum level in the vacuum tubing 52. Further, the tank monitor 42 may first check information from the differential pressure indicator 57 after detecting a leak detection, but before generating an alarm, to determine if the leak detection is a result of a true leak or a problem with the vacuum level generation by the STP 15.

In the embodiments further described and illustrated herein, the differential pressure indicator 57 does not affect the tank monitor 42 generating a leak detection alarm. The differential pressure indicator 57 is used as a further information source when diagnosing a leak detection alarm generated by the tank monitor 42. However, the scope of the present invention encompasses use of the differential pressure indicator 57 as both an information source to be used after a leak detection alarm is generated and as part of a process to determine if a leak detection alarm should be generated.

The sensing unit 46 also contains a liquid trap conduit 58 that extends out of the STP sump 38 and into the fuel storage tank 10. The liquid trap conduit 58 is fluidly coupled to the interstitial space 14 at the bottom as illustrated in FIG. 1. The liquid detection trap 58 is nothing more than a conduit that contains a liquid detection sensor 60 so that any liquid that leaks into the interstitial space 14 causes the liquid detection sensor 60 to detect a liquid leak which is then reported to the tank monitor 42. The liquid detection sensor 60 may contain a liquid detection sensor 60 that may be used in the present invention is the "Interstitial Sensor for Steel Tanks," sold by Veeder-Root Company and described in the accompanying document and http://www.veeder-root.com/dynamic/index.cfm?pageID=175, incorporated herein by reference in its entirety.

The liquid detection sensor 60 is communicatively coupled to the sensing unit controller 48 via a communication line 64. The sensing unit controller 48 can in turn generate an alarm and/or communicate the detection of liquid to the tank monitor 42 to generate an alarm and/or shut down the STP 15. The liquid detection sensor 60 can be located anywhere in the liquid trap conduit 58, but is preferably located at the bottom of the liquid trap conduit 58 at its lowest point so that any liquid in the liquid trap conduit 58 will be pulled towards the liquid detection sensor 60 by gravity. If liquid, such as leaked fuel 11, is present in the interstitial space 14, the liquid will be detected by the liquid detection sensor 60. The tank monitor 42 can detect liquid in the interstitial space 14 at certain times or at all times, as programmed.

If liquid leaks into the liquid trap conduit 58, it will be removed at a later time, typically after a liquid leak detection alarm has been generated, by service personnel using a suction device that is placed inside the liquid trap conduit 58 to remove the liquid. In an alternative embodiment, the liquid trap conduit 58 may also be coupled to a liquid sump 66, typically placed at the bottom of the liquid trap conduit 58. A drain valve 68 is placed inline between the liquid trap conduit 58 and the liquid sump 66 that is opened and closed manually. During normal operation, the drain valve 68 is closed, and any liquid collected in the liquid trap conduit 58 rests at the bottom with the float 62. If liquid is detected by the liquid detection sensor 60 and service personnel are dispatched to the scene, the service personnel can drain the trapped liquid by opening the drain valve 68, and the liquid will enter the liquid sump 66 for safe keeping and so that the system can again detect new leaks in the sensing unit 46. When it is desired to empty the liquid sump 66, the service personnel can either drain the liquid sump 66 or draw the liquid out of the liquid sump 66 using a vacuum device.

Now that the main components of the present invention have been described, the remainder of this application describes the functional operation of these components in order to perform leak detection tests in the interstitial space 14 of the fuel storage tank 10 and liquid detection in the sensing unit 46. The present invention is capable of performing two types of leak detections tests: precision and catastrophic. A catastrophic leak is defined as a major leak where a vacuum level in the interstitial space 14 changes very quickly due to a large leak in the interstitial space 14. A precision leak is defined as a leak where the vacuum level in the interstitial space 14 changes less drastically than a vacuum level change for a catastrophic leak.

Figure 2A:
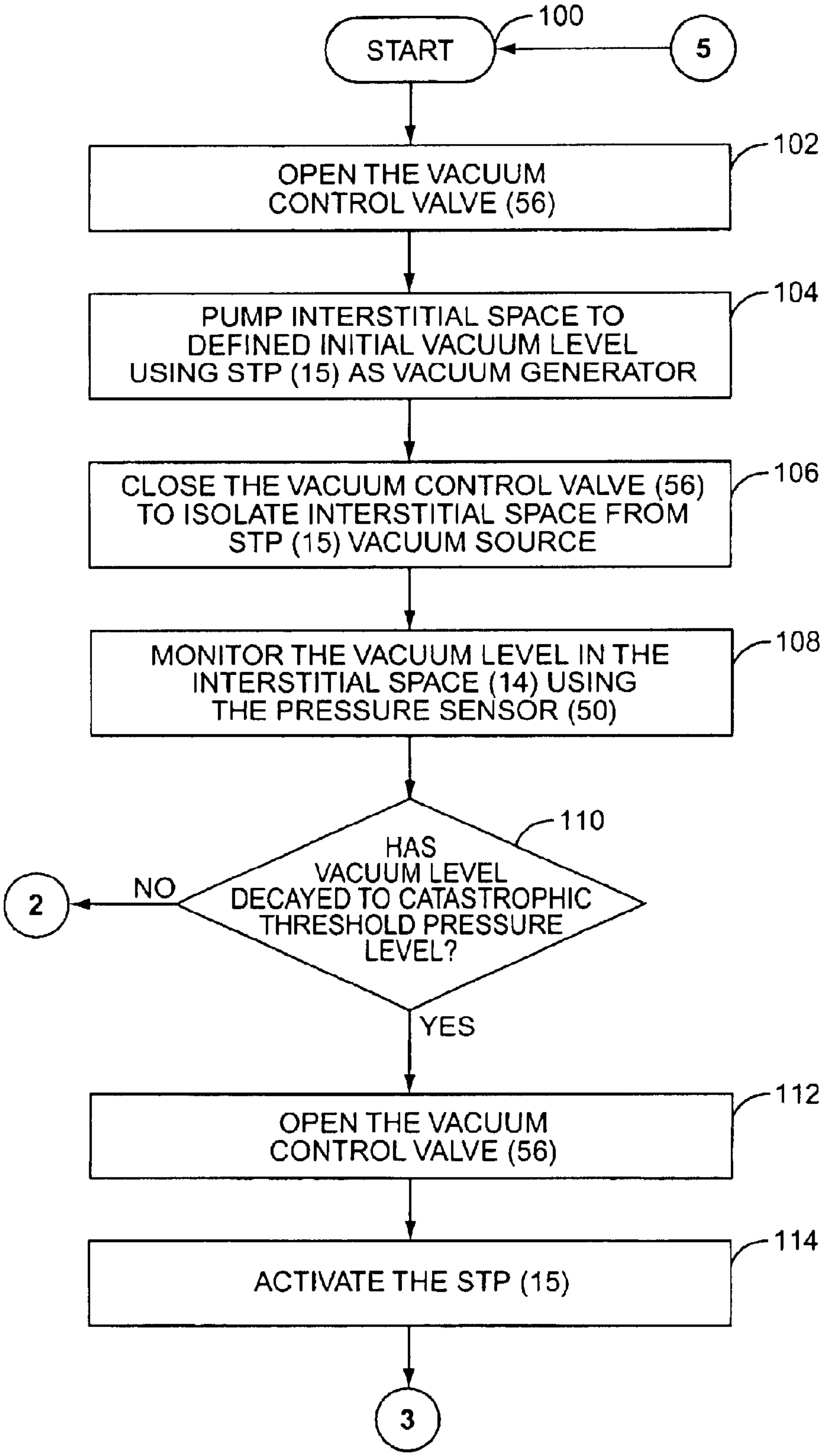
FIG. 2A is a flowchart diagram illustrating one embodiment of the leak detection test of the present invention.
Figure 2B:
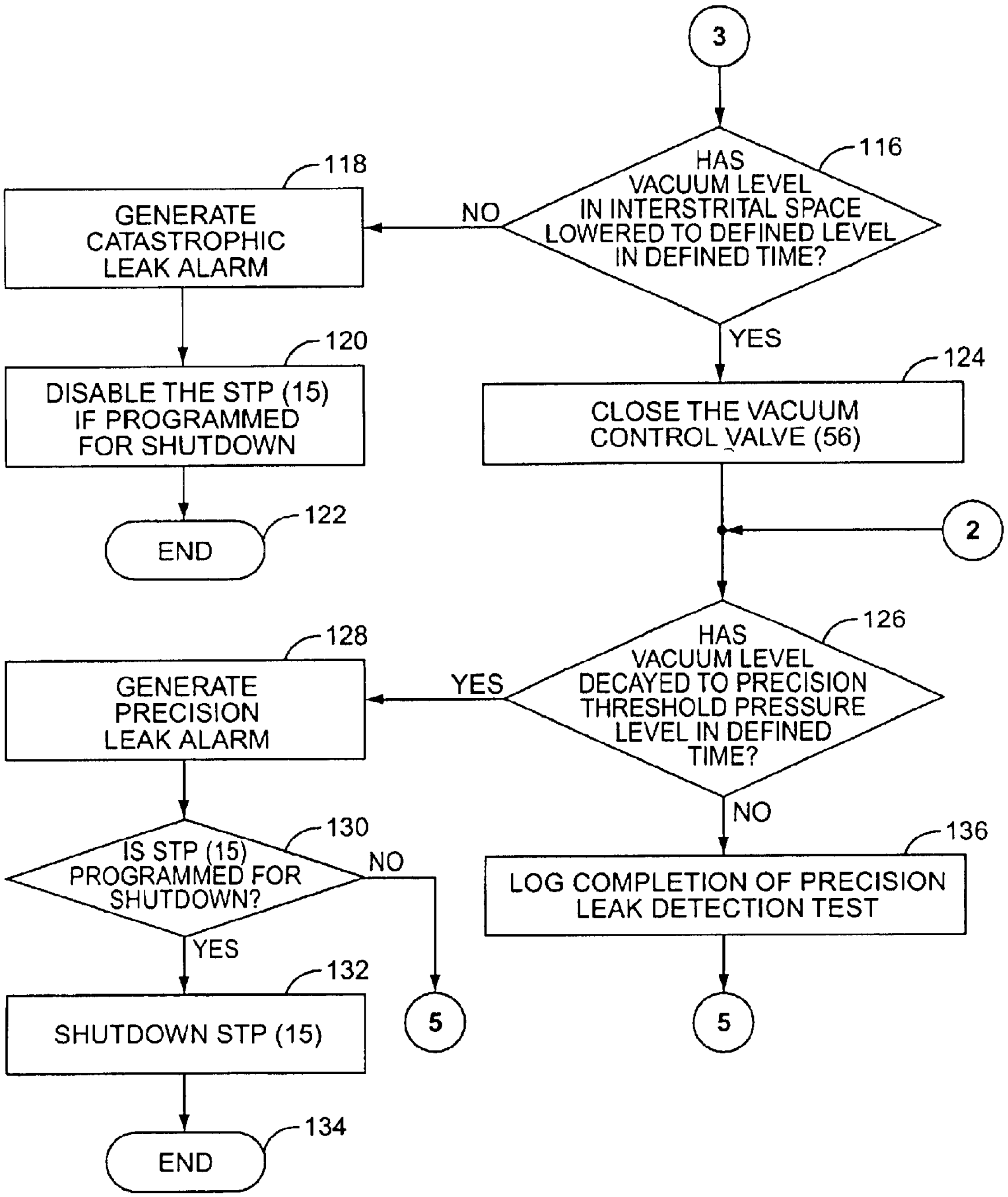
FIG. 2B is a flowchart diagram that is a continuation of the flowchart in FIG. 2A.

FIGS. 2A and 2B provide a flowchart illustration of the leak detection operation of the sensing unit according to one embodiment of the present invention that performs both the catastrophic and precision leak detection tests. The tank monitor 42 directs the sensing unit 46 to begin a leak detection test to start the process (step 100). Alternatively, a test may be started automatically if the vacuum level reaches a threshold. In response, the sensing unit controller 48 opens the vacuum control valve 56 (step 102) so that the STP 15 is coupled to the interstitial space 14 of the fuel storage tank 10 vis the vacuum tubing 52. The STP 15 provides a vacuum source and pumps the air, gas, and/or liquid out of the vacuum tubing 52 and the interstitial space 14, via its coupling to the vacuum tubing 52, after receiving a test initiation signal from the tank monitor 42. The STP 15 pumps the air, gas, or liquid out of the interstitial space 14 until a defined initial threshold vacuum level is reached or substantially reached (step 104). The tank monitor 42 receives the vacuum level of the interstitial space 14 via the measurements from the pressure sensor 50 communication to the sensing unit controller 48. This defined initial threshold vacuum level is −15 inches of Hg in one embodiment of the present invention, and may be a programmable vacuum level in the tank monitor 42. Also, note that if the vacuum level in the interstitial space 14 is already at the defined initial threshold vacuum level or substantially close to the defined initial vacuum threshold level sufficient to perform the leak detection test, steps 102 and 104 may be skipped.

After the vacuum level in the vacuum tubing 52 reaches the defined initial threshold vacuum level, as ascertained by monitoring of the pressure sensor 50, the tank monitor 42 directs the sensing unit controller 48 to deactivate the STP 15 (except if the STP 15 has been turned on for fuel dispensing) and to close the vacuum control valve 56 to isolate the interstitial space 14 from the STP 15 (step 106). Next, the tank monitor 42 monitors the vacuum level using vacuum level readings from the pressure sensor 50 via the sensing unit controller 48 (step 108). If the vacuum level decays to a catastrophic threshold vacuum level, which may be −10 inches of Hg in one embodiment of the present invention and also may be programmable in the tank monitor 42, this is an indication that a catastrophic leak may exist (decision 110). The sensing unit 46 opens the vacuum control valve 56 (step 112) and activates the STP 15 (except if the STP 15 is already turned on for fuel dispensing) to attempt to restore the vacuum level back to the defined initial threshold vacuum level (−15 inches of Hg in the specific example) (step 114).

Continuing onto FIG. 2B, the tank monitor 42 determines if the vacuum level in the interstitial space 14 has lowered back down to the defined initial threshold vacuum level (−15 inches of Hg in the specific example) within a defined period of time, which is programmable in the tank monitor 42 (decision 116). If not, this is an indication that a major leak exists in the outer casing 13 of the interstitial space 14 or the vacuum tubing 52, and the tank monitor 42 generates a catastrophic leak detection alarm (step 118). The tank monitor 42, if so programmed, will shut down the STP 15 so that the STP 15 does not pump fuel 11 to fuel dispensers that may leak due to the breach in the outer casing 13 (step 120), and the process ends (step 122). An operator or service personnel can then manually check the integrity of the interstitial space 14, vacuum tubing 52, and/or conduct additional leak detection tests on-site, as desired, before allowing the STP 15 to be operational again. If the vacuum level in the interstitial space 14 does lower back down to the defined initial threshold vacuum level within the defined period of time (decision 116), no leak detection alarm is generated at this point in the process.

Back in decision 110, if the vacuum level did not decay to the defined initial threshold vacuum level (−10 inches of Hg in specific example), this is also an indication that a catastrophic leak does not exist. Either way, if the answer to decision 110 is no or the answer to decision 116 is no, the tank monitor 42 goes on to perform a precision leak detection test since no catastrophic leak exists. The tank monitor 42 then continues to perform a precision leak detection test.

For the precision leak detection test, the tank monitor 42 directs the sensing unit controller 48 to close the vacuum control valve 56 if the process reached decision 116 (step 124). Next, regardless of whether the process came from decision 110 or decision 116, the tank monitor 42 determines if the vacuum level in the interstitial space 14 has decayed to a precision threshold vacuum level within a defined period of time, both of which may be programmable (decision 126). If not, the tank monitor 42 logs the precision leak detection test as completed with no alarm (step 136), and the leak detection process restarts again as programmed by the tank monitor 42 (step 100).

If the vacuum level in the interstitial space 14 has decayed to a precision threshold vacuum level within the defined period of time, the tank monitor 42 generates a precision leak detection alarm (step 128). The tank monitor 42 determines if it is has been programmed to shut down the STP 15 in the event of a precision leak detection alarm (decision 130). If yes, the tank monitor 42 shuts down the STP 15 (step 132), and the process ends (step 134). If not, the STP 15 can continue to operate when fuel dispensers are activated, and the leak detection process restarts again as programmed by the tank monitor 42 (step 100). This is because it may be acceptable to allow the STP 15 to continue to operating if a precision leak detection alarm occurs depending on regulations and procedures. Also, note that both the precision threshold vacuum level and the defined period of time may be programmable at the tank monitor 42 according to levels that are desired to be indicative of a precision leak.

Once a catastrophic leak or precision leak detection alarm is generated, service personnel are typically dispatched to determine if a leak really exists, and if so, to take corrective measures. The service personnel can close the isolation valve 54 between the sensing unit 46 and the interstitial space 14 to isolate the two from each other. The service personnel can then initiate leak tests manually from the tank monitor 42 that operate as illustrated in FIGS. 2A and 2B. If the leak detection tests pass after previously failing and after the isolation valve 54 is closed, this is indicative that some area of the interstitial space 14 contains the leak. If the leak detection tests continue to fail, this is indicative that the leak may be present in the vacuum tubing 52 connecting the sensing unit 46 to the interstitial space 14, or within the vacuum tubing 52 in the sensing unit 46, or the vacuum tubing 52 between sensing unit 46 and the STP 15. Closing of the isolation valve 54 also allows components of the sensing unit 46 and vacuum tubing 52 to be replaced without relieving the vacuum of the interstitial space 14 since it is not desired to recharge the system vacuum and possibly introduce vapors or liquid into the interstitial space 14 since the interstitial space 14 is under a vacuum and will draw in air or liquid if vented.

Figure 3:
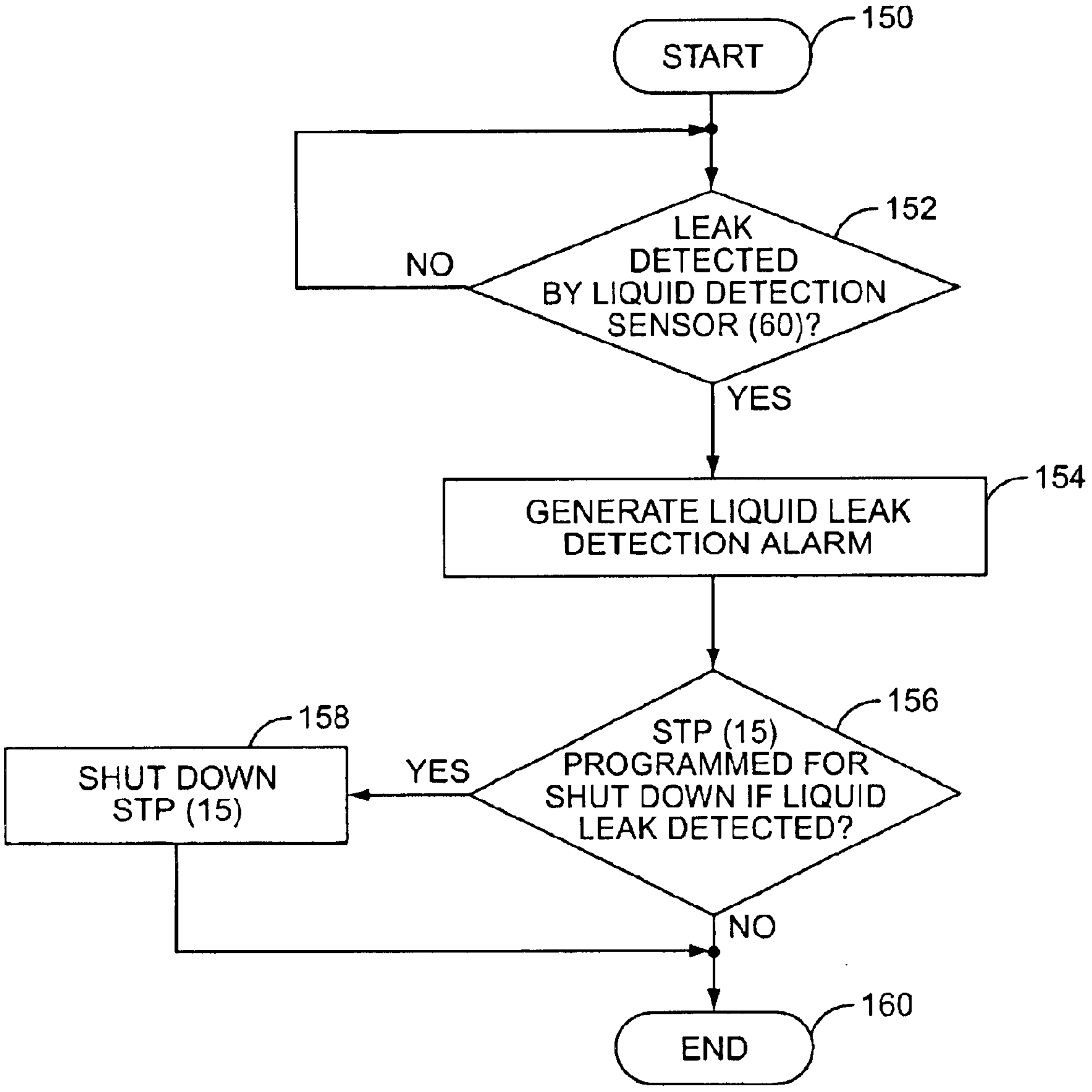
FIG. 3 is a flowchart diagram of the liquid lead detection test.

FIG. 3 is a flowchart diagram of a liquid leak detection test performed by the tank monitor 42 to determine if a leak is present in the interstitial space 14. The liquid leak detection test may be performed by the tank monitor 42 on a continuous basis or periodic times, depending on the programming of the tank monitor 42. Service personnel may also cause the tank monitor 42 to conduct the liquid leak detection test manually.

The process starts (step 150), and the tank monitor 42 determines if a leak has been detected by the liquid detection sensor 60 (decision 152). If not, the tank monitor 42 continues to determine if a leak has been detected by the liquid detection sensor (60) in a continuous fashion. If the tank monitor 42 does determine from the liquid detection sensor 60 that a leak has been detected, the tank monitor 42 generates a liquid leak detection alarm (step 154). If the tank monitor 42 has been programmed to shut down the STP 15 in the event of a liquid leak detection alarm being generated (decision 156), the tank monitor 42 shuts down the STP 15 (if the STP 15 is on for fuel dispensing) (step 158), and the process ends (step 160). If the tank monitor 42 has not been programmed to shut down the STP 15 in the event of a liquid leak detection alarm being generated, the process just ends without taking any action with respect to the STP 15 (step 160).

Figure 4:
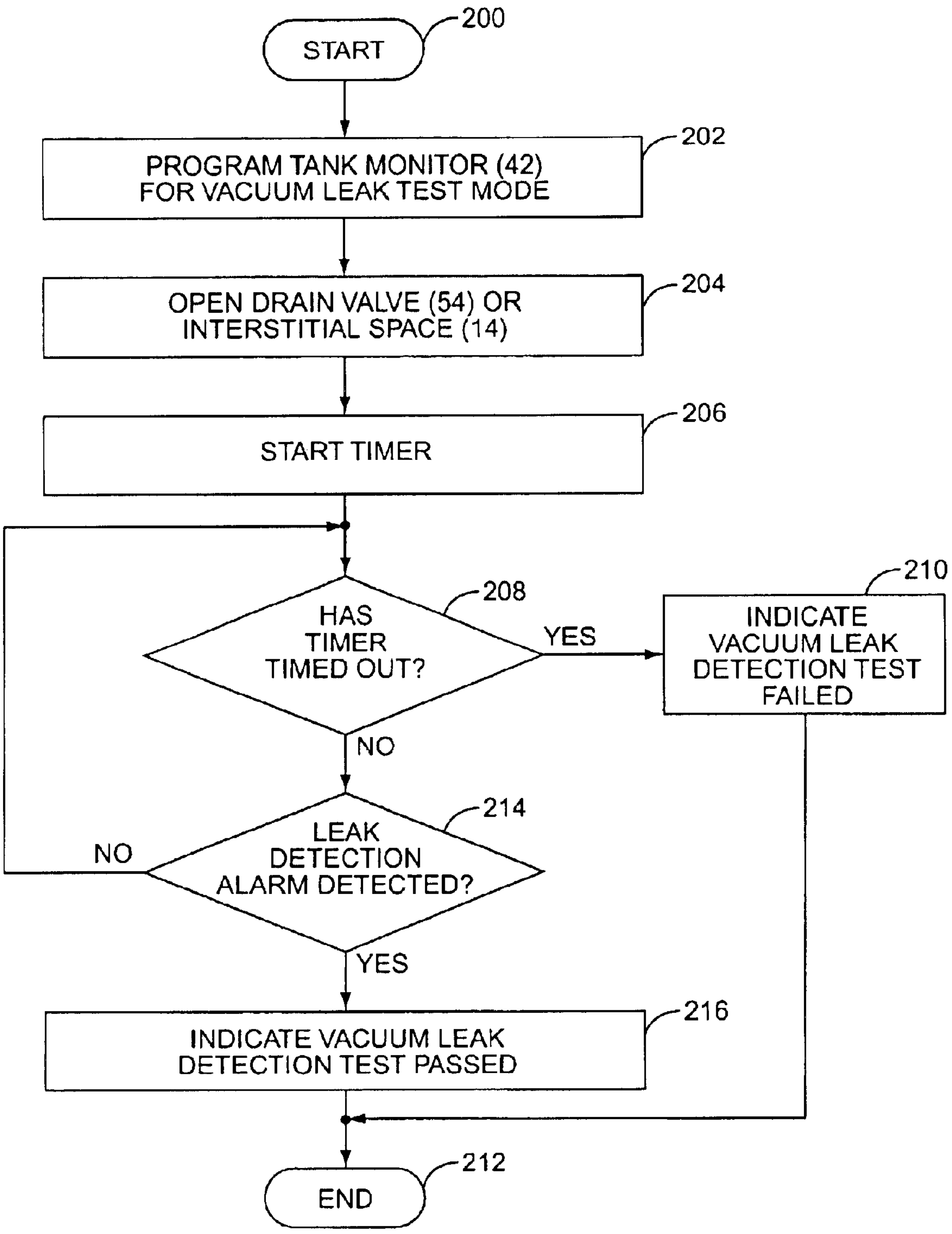
FIG. 4 is a flowchart diagram of a functional vacuum leak detection test that is carried out in a tank monitor test mode.

FIG. 4 is a flowchart diagram that discloses a functional vacuum leak detection test performed to determine if the sensing unit 46 can properly detect a purposeful leak. If a leak is introduced into the interstitial space 14, and a leak is not detected by the sensing unit 46 and/or tank monitor 42, this is an indication that some component of the leak detection system is not working properly.

The process starts (step 200), and service personnel programs the tank monitor 42 to be placed in a functional vacuum leak detection test mode (step 202). Next, -service personnel manually opens the drain valve 68 or other valve to provide an opening in the interstitial space 14 or vacuum tubing 52 so that a leak is present in the interstitial space 14 (step 204). The tank monitor 42 starts a timer (step 206) and determines when the timer has timed out (decision 208). If the timer has not timed out, the tank monitor 42 determines if a leak detection alarm has been detected (decision 214). If not, the process continues until the timer times out (decision 208). If a leak detection alarm has been generated, as is expected, the tank monitor 42 indicates that the functional vacuum leak detection test passed and that the leak detection system is working properly (step 216), and the process ends (step 212).

If the timer has timed out without a leak being detected, this is indicative that the functional vacuum leak detection test failed (step 210) and that there is a problem with the system, which could be a component of the sensing unit 46 and/or tank monitor 42. Note that although this functional vacuum leak detection test requires manual intervention to open the drain valve 68 or other valve to place a leak in the interstitial space 14 or vacuum tubing 52, this test could be automated if the drain valve 68 or other valve in the interstitial space 14 or vacuum tubing 52 was able to be opened and closed under control of the sensing unit 46 and/or tank monitor 42.

Figure 5:
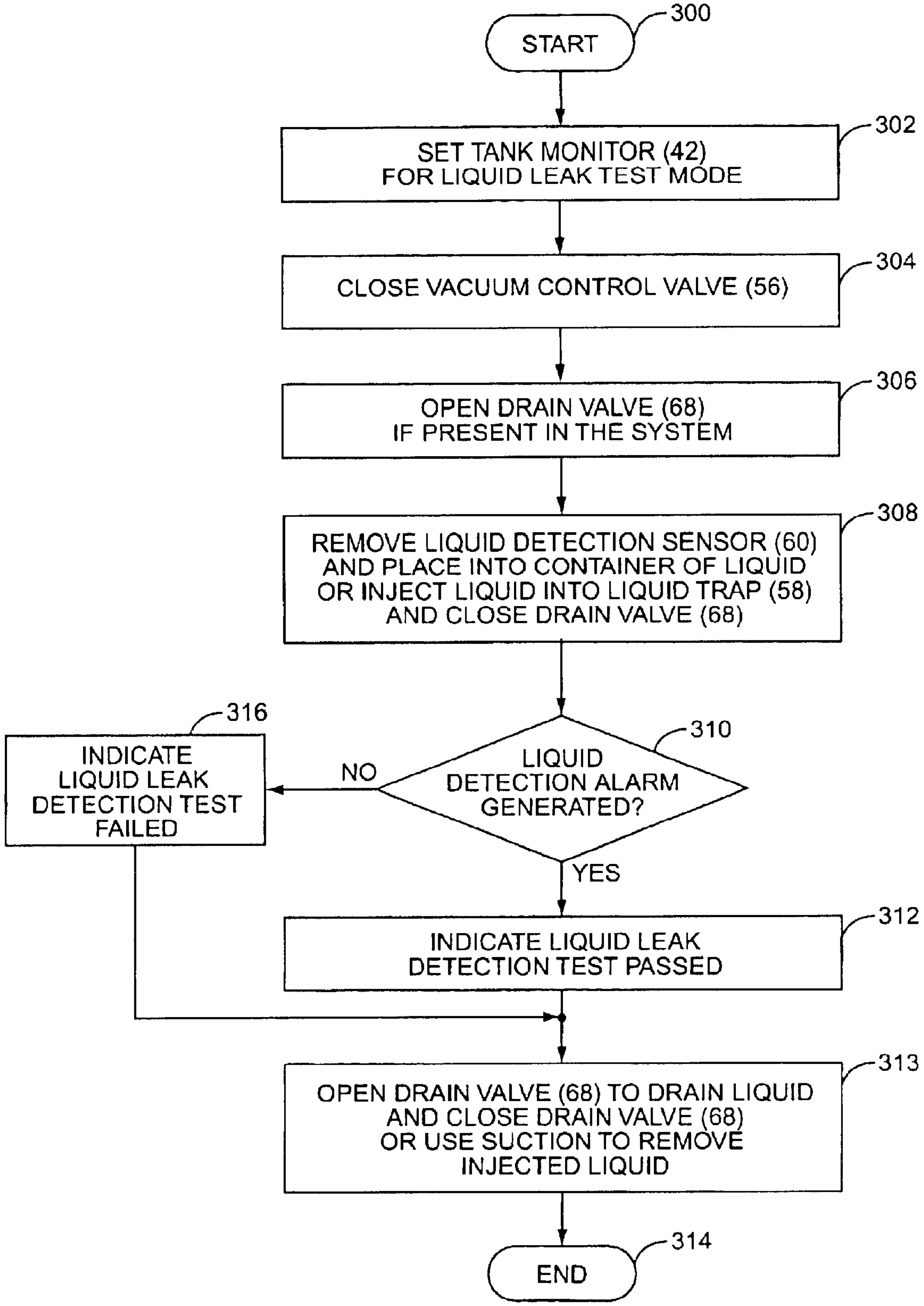
FIG. 5 is a flowchart diagram of a functional liquid leak detection test that is carried out in a tank monitor test mode.

FIG. 5 illustrates a functional liquid leak detection test that can be used to determine if the liquid detection system of the present invention is operating properly. The liquid detection sensor 60 is removed from the liquid trap conduit 58 and submerged into a container of liquid (not shown). Or in an alternative embodiment, a purposeful liquid leak is injected into the liquid trap conduit 58 to determine if a liquid leak detection alarm is generated. If a liquid leak detection alarm is not generated when liquid is placed on the liquid detection sensor 60, this indicates that there has been a failure or malfunction with the liquid detection system, including possibly the liquid detection sensor 60, the sensing unit 46, and/-or the tank monitor 42.

The process starts (300), and the tank monitor 42 is set to a mode for perform the functional liquid leak detection test (step 302). The vacuum control valve 56 may be closed to isolate the liquid trap conduit 58 from the STP 15 so that the vacuum level in the conduit piping 52 and sensing unit 46 is not released when the drain valve 68 is opened (step 304). Note that this is an optional step. Next, the drain valve (68) or interstitial space 14 is opened if present in the system (step 306). The liquid detection sensor 60 is either removed and placed into a container of liquid, or liquid is inserted into liquid trap conduit 58, and the drain valve 68 is closed (step 308). If the tank monitor 42 detects a liquid leak from the sensing unit 46 (decision 310), the tank monitor 42 registers that the functional liquid leak detection test as passed (step 312). If no liquid leak is detected (decision 310), the tank monitor 42 registers that the functional liquid leak detection test failed (step 316). After the test is conducted, if liquid was injected into the liquid trap conduit 58 as the method of subject the liquid detection sensor 60 to a leak, either the drain valve 68 is opened to allow the inserted liquid to drain and then closed afterwards for normal operation or a suction device is placed into the liquid trap conduit 58 by service personnel to remove the liquid (step 313), and the process ends (step 314).

Note that although this functional liquid leak detection test requires manual intervention to open and close the drain valve 68 and to inject a liquid into the liquid trap conduit 58, this test may be automated if a drain valve 68 is provided that is capable of being opened and closed under control of the sensing unit 46 and/or tank monitor 42 and a liquid could be injected into the liquid trap conduit 58 in an automated fashion.

Figure 6:
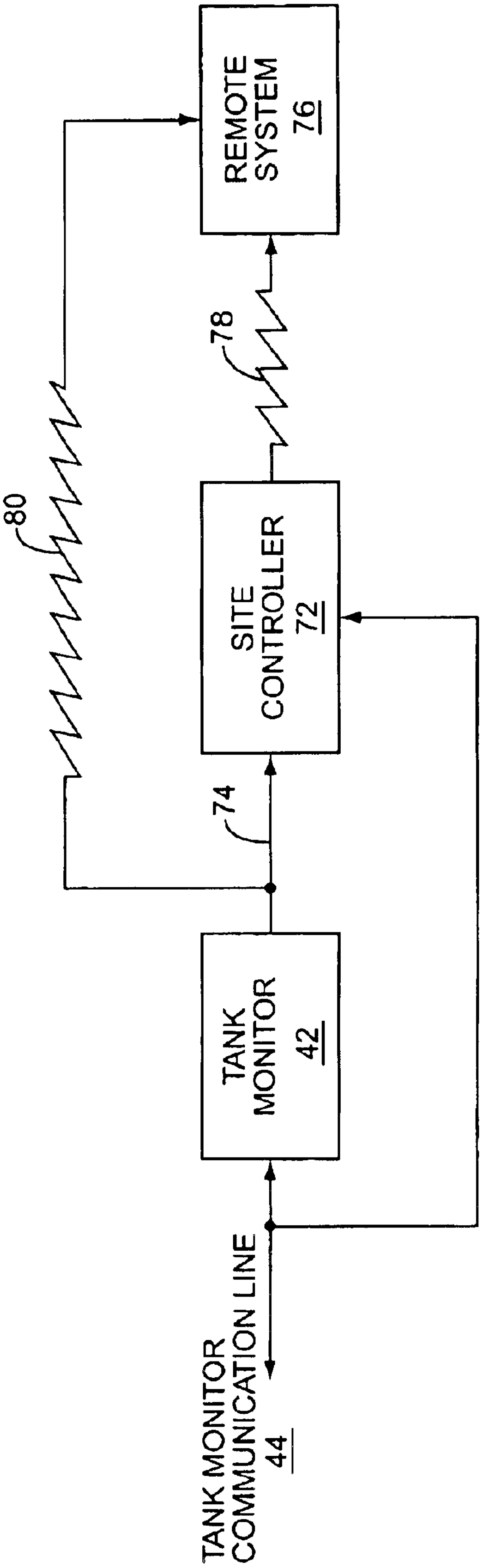
FIG. 6 is a schematic diagram of a tank monitor communication architecture.

FIG. 6 illustrates a communication system whereby leak detection alarms and other information obtained by the tank monitor 42 may be communicated to other systems if desired. The information from the tank monitor 42 and sensing unit 46, such as leak detection alarms for example, may be desired to be communicated to other systems as part of a reporting and dispatching process to alert service personnel or other systems as to a possible breach or leak in the fuel storage tank 10.

The tank monitor 42 may be communicatively coupled to a site controller 72 via a communication line 74. The communication line 74 may be any type of electronic communication connection, including a direct wire connection, or a network connection, such as a local area network (LAN) or other bus communication. An example of a site controller is G-Site® manufactured by Gilbarco Inc. The tank monitor 42 may communicate leak detection alarms, vacuum level/pressure level information, and the other information from the sensing unit 46 to the site controller 72. The site controller 72 may be further communicatively coupled to a remote system 76 to communicate this same information to the remote system 76 from the tank monitor 42 and the site controller 72 via a remote communication line 78. The remote communication line 78 may be any type of electronic communication connection, such as a PSTN, or network connection, such as the Internet, for example. The tank monitor 42 may also be directly connected to the remote system 76 using a remote communication line 80 rather than through the site controller 72.

Note that any type of controller, control system, sensing unit controller 48, site controller 72, and remote system 76 may be used interchangeably with the tank monitor 42 as described in this application and in this application claims.

Those skilled in the art will recognize improvements and modifications to the preferred embodiments of the present invention. All such improvements and modifications are considered within the scope of the concepts disclosed herein and the claims that follow. Note that the sensing unit 46 may be contained inside the STP housing 16 or outside the STP housing 16. The leak detection tests may be carried out by the STP 15 applying a vacuum to the interstitial space 14 that can be either negative or positive for vacuum level changes indicate of a leak.

What is claimed is:

1. A system for detecting a leak in a double-walled fuel storage tank having an interstitial space in a service station environment, comprising:

a sensing unit, comprising:

a vacuum tubing that is coupled to the interstitial space of the fuel storage tank;

a pressure sensor that is coupled to said vacuum tubing to detect the vacuum level in the interstitial space of the fuel storage tank; and a sensing unit controller that is coupled to said pressure sensor to determine the vacuum level in the interstitial space of the fuel storage tank; and a submersible turbine pump that is fluidly coupled to the fuel in the fuel storage tank to draw the fuel out of the fuel storage tank, wherein said submersible turbine pump is also coupled to said vacuum tubing;

said submersible turbine pump creates a vacuum level in said vacuum tubing to create a vacuum level in the interstitial space of the fuel storage tank wherein said sensing unit controller monitors the vacuum level in the interstitial space of the fuel storage tank.

2. The system of claim 1, further comprising a tank monitor that is electrically coupled to said submersible turbine pump wherein said submersible turbine pump creates a defined initial threshold vacuum level in the interstitial space after receiving a test initiation signal from said tank monitor.

3. The system of claim 2, further comprising a differential pressure indicator that is coupled to said vacuum tubing between said submersible turbine pump and said sensing unit, and is communicatively coupled to said tank monitor wherein said monitor determines if said submersible turbine pump is drawing a sufficient vacuum level in said vacuum tubing.

4. The system of claim 3, wherein said tank monitor generates an alarm if said differential pressure indicator indicates that said submersible turbine pump is not drawing a sufficient vacuum level in said vacuum tubing.

5. The system of claim 2, wherein said tank monitor generates a catastrophic leak detection alarm if said submersible turbine pump cannot create said defined initial threshold vacuum level in the interstitial space.

6. The system of claim 5, wherein said tank monitor communicates said catastrophic leak detection alarm to a system comprised from the group consisting of a site controller and a remote system.

7. The system of claim 2, wherein said tank monitor is electrically coupled to said sensing unit controller to receive the vacuum level in the interstitial space of the fuel storage tank.

8. The system of claim 7, wherein said tank monitor determines if the vacuum level in the interstitial space has decayed to a catastrophic threshold vacuum level from said defined initial threshold vacuum level.

9. The system of claim 8, wherein said tank monitor activates said submersible turbine pump to attempt to lower the vacuum level in the interstitial space back down to said defined initial threshold vacuum level if the vacuum level in the interstitial space decays to said catastrophic threshold vacuum level.

10. The system of claim 9, wherein said tank monitor determines if the vacuum level in the interstitial space lowers to said defined initial threshold vacuum level within a defined amount of time.

11. The system of claim 10, wherein said tank monitor generates a catastrophic leak detection alarm if the vacuum level in the interstitial space does not lower to said defined initial threshold vacuum level with said defined amount of time.

12. The system of claim 7, wherein the electrical coupling between said tank monitor and said sensing unit uses intrinsically safe wiring.

13. The system of claim 7, wherein said tank monitor determines if a leak exists in the fuel storage tank by determining if the vacuum level in the interstitial space decays to a threshold vacuum level in a predetermined amount of time.

14. The system of claim 13, wherein said threshold vacuum level is a precision threshold vacuum level.

15. The system of claim 7, further comprising an isolation valve located in said vacuum tubing between said sensing unit and the interstitial space wherein closing said isolation valve isolates the interstitial space from the sensing unit to allow verification of a leak in the fuel storage tank without relieving the vacuum in the interstitial space.

16. The system of claim 7, further comprising a drain valve within said vacuum tubing to drain any leaked fuel out of said vacuum tubing wherein said tank monitor indicates a pass condition to a vacuum leak test when said drain valve is manually opened and said tank monitor determines that the vacuum level in the interstitial space falls below a vacuum level threshold level in a predetermined amount of time.

17. The system of claim 16, wherein said drain valve is located at the lowest point of said vacuum tubing.

18. The system of claim 7, further comprising a liquid detection sensor that is coupled to the interstitial space, wherein said liquid detection sensor is coupled to said sensing unit controller and wherein said liquid detection sensor detects if liquid is present in the interstitial space.

19. The system of claim 18, wherein said sensing unit controller communicates a liquid detection by said liquid detection sensor to said tank monitor.

20. The system of claim 19, wherein said tank monitor generates a leak detection alarm when said liquid detection is communicated from said sensing unit controller.

21. The system of claim 20, wherein said tank monitor communicates said leak detection alarm to a system comprised from the group consisting of a site controller and a remote system.

22. The system of claim 18, wherein said tank monitor disables said submersible turbine pump when said liquid detection is communicated from said sensing unit controller.

23. The system of claim 18, wherein said liquid detection sensor comprises a float.

24. The system of claim 18, wherein said tank monitor indicates a pass condition to a functional liquid leak detection test when liquid is placed on said liquid detection sensor and said liquid detection sensor detects liquid.

25. The system of claim 1, further comprising a vacuum control valve that is coupled inline to said vacuum tubing between said submersible turbine pump and said pressure sensor wherein said vacuum control valve is electrically coupled under control of said sensing unit controller.

26. The system of claim 25, wherein said sensing unit controller closes said vacuum control valve before monitoring the vacuum level in the interstitial space of the fuel storage tank to determine if a leak exists in the fuel storage tank so that said submersible turbine pump is isolated from the interstitial space.

27. The system of claim 1, further comprising a check valve located in said vacuum tubing between said submersible turbine pump and said sensing unit to prevent ingress from the interstitial space to said submersible turbine pump.

28. A system for conducting a functional vacuum leak detection test for a fuel storage tank having an interstitial space in a service station environment, comprising:

a sensing unit, comprising:

a vacuum tubing that is coupled to the interstitial space of the fuel storage tank;

a pressure sensor that is coupled to said vacuum tubing to detect the vacuum level in the interstitial space of the fuel storage tank; and a sensing unit controller that is coupled to said pressure sensor to determine the vacuum level in the interstitial space of the fuel storage tank;

a drain valve located in said vacuum tubing to drain any leaked fuel out of said vacuum tubing;

a controller coupled to said sensing unit; and a submersible turbine pump that is electrically coupled and under control of a tank monitor, wherein said submersible turbine pump is fluidly coupled to the fuel in the fuel storage tank to draw the fuel out of the fuel storage tank; and wherein said submersible turbine pump is coupled to said vacuum tubing, wherein said tank monitor causes said submersible turbine pump to generate a vacuum level in the interstitial space when said drain valve is opened wherein said sensing unit controller monitors the vacuum level in the interstitial space and said tank monitor indicates that the vacuum leak test passed if a leak is detected by said sensing unit.

29. The system of claim 28, wherein said tank monitor communicates said indication of the functional vacuum leak detection test to a system comprised from the group consisting of a site controller and a remote system.

30. A system for conducting a liquid leak detection test for a fuel storage tank having an interstitial space in a service station environment, comprising:

a sensing unit, comprising:

a vacuum tubing that is coupled to the interstitial space of the fuel storage tank;

a pressure sensor that is coupled to said vacuum tubing to detect the vacuum level in the interstitial space of the fuel storage tank;

a sensing unit controller that is coupled to said pressure sensor to determine the vacuum level in the interstitial space of the fuel storage tank; and a liquid detection sensor located in the interstitial space, wherein said liquid detection sensor detects if liquid is present in the interstitial space;

a submersible turbine pump that is fluidly coupled to the fuel in the fuel storage tank to draw the fuel out of the fuel storage tank wherein said submersible turbine pump is also coupled to said vacuum tubing, wherein said submersible turbine pump creates a vacuum level in said vacuum tubing to create a vacuum level in the interstitial space of the fuel storage tank wherein said sensing unit controller monitors the vacuum level in the interstitial space of the fuel storage tank; and a controller coupled to said sensing unit wherein said controller indicates that the functional liquid leak detection test passed if said sensing unit detects liquid present in said liquid trap when said liquid detection sensor is placed in contact with liquid.

31. The system of claim 30, further comprising a drain valve coupled to the interstitial space to drain any leaked fuel out of the interstitial space.

32. The system of claim 30, wherein said controller communicates said indication of the functional liquid leak detection test to a system comprised from the group consisting of a site controller and a remote system.

33. A method for detecting a leak in a double-walled fuel storage tank having an interstitial space in a service station environment, comprising the steps of:

creating a defined initial threshold vacuum level in a vacuum tubing fluidly coupled to the interstitial space using a submersible turbine pump that is also fluidly coupled to the fuel in the fuel storage tank to draw the fuel out of the fuel storage tank;

sensing the vacuum level in the interstitial space using a pressure sensor;

communicating the vacuum level in the interstitial space to a tank monitor; and monitoring the vacuum level in the interstitial space to determine if a leak exists in the fuel storage tank.

34. The method of claim 33, further comprising the step of sending a test initiation signal to said submersible turbine pump before performing said step of creating a vacuum level.

35. The method of claim 34, wherein said step of monitoring further comprises determining if a leak exists in the fuel storage tank by determining if the vacuum level in the interstitial space decays to a threshold vacuum level in a predetermined amount of time.

36. The method of claim 35, wherein said threshold vacuum level is a precision threshold vacuum level.

37. The method of claim 34, wherein said step of monitoring further comprising determining if the vacuum level in the interstitial space has decayed to a catastrophic threshold vacuum level from said defined initial threshold vacuum level.

38. The method of claim 37, wherein said step of monitoring further comprises activating said submersible turbine pump to attempt to lower the vacuum level in the interstitial space back down to said defined initial threshold vacuum level if the vacuum level in the interstitial space decays to said catastrophic threshold vacuum level.

39. The method of claim 38, wherein said step of monitoring further comprises determining if the vacuum level in the interstitial space lowers to said defined initial threshold vacuum level within a defined amount of time.

40. The method of claim 39, wherein said step of monitoring further comprises generating a catastrophic leak detection alarm if the vacuum level in the interstitial space does not lower to said defined initial threshold vacuum level with said defined amount of time.

41. The method of claim 40, further comprising communicating said catastrophic leak detection alarm to a system comprised from the group consisting of a site controller and a remote system.

42. The method of claim 33, further comprising the step of sensing whether fluid is present in the interstitial space using a liquid detection sensor.

43. The method of claim 42, further comprising generating a liquid leak detection alarm if said liquid detection sensor senses liquid in the interstitial space.

44. The method of claim 43, further comprising communicating said liquid leak detection alarm to a system comprised from the group consisting of a site controller and a remote system.

45. The method of claim 42, further comprising disabling said submersible turbine pump if said liquid detection sensor senses liquid in the interstitial space.

46. The method of claim 33, further comprising closing a vacuum control valve to isolate said submersible turbine pump from the interstitial space before performing said step of monitoring the vacuum level in the interstitial space.

47. The method of claim 33, further comprising verifying a leak in the interstitial space by closing an isolation valve in said vacuum tubing that isolates the interstitial space from said submersible turbine pump.

48. The method of claim 33, further comprising preventing ingress from the interstitial space to said submersible turbine pump.

49. The method of claim 33, further comprising determining if said submersible turbine pump is drawing a sufficient vacuum level in the interstitial space.

50. The system of claim 49, further comprising generating an alarm if said submersible turbine pump is not drawing a sufficient vacuum level in the interstitial space.

51. A method for conducting a functional vacuum leak test for a fuel storage tank having an interstitial space in a service station environment, comprising:

opening a drain valve located in a vacuum tubing fluidly coupled to the interstitial space;

creating a vacuum level in said vacuum tubing using a submersible turbine pump that is also fluidly coupled to the fuel in the fuel storage tank to draw the fuel out of the fuel storage tank;

sensing the vacuum level in the interstitial space using a pressure sensor;

communicating the vacuum level in the interstitial space to a tank monitor; and indicating a vacuum leak test pass condition if the vacuum level in the interstitial space falls below a threshold vacuum level.

52. The method claim of 51, wherein said step of indicating further comprises indicating a vacuum leak test pass condition if the vacuum level in the interstitial space falls below a threshold vacuum level within a defined amount of time.

* * * * *